United States Patent
Müller et al.

(10) Patent No.: US 12,337,908 B2
(45) Date of Patent: Jun. 24, 2025

(54) CONNECTING SYSTEM AND TRACTOR LINKAGE

(71) Applicant: ZF Friedrichshafen AG, Friedrichshafen (DE)

(72) Inventors: Jannik Müller, Friedrichshafen (DE); Frank Jauch, Eriskirch (DE); Thomas Jäger, Meckenbeuren (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 322 days.

(21) Appl. No.: 17/820,955

(22) Filed: Aug. 19, 2022

(65) Prior Publication Data
US 2023/0159117 A1    May 25, 2023

(30) Foreign Application Priority Data
Aug. 20, 2021    (DE) .......................... 102021209167.9

(51) Int. Cl.
*B62D 53/12*    (2006.01)

(52) U.S. Cl.
CPC ................... *B62D 53/125* (2013.01)

(58) Field of Classification Search
CPC ........... B62D 53/125; B60D 1/64; B60D 1/62
See application file for complete search history.

(56) References Cited

U.S. PATENT DOCUMENTS

| | | | | |
|---|---|---|---|---|
| 11,048,251 | B2 * | 6/2021 | Wood | G05D 1/0088 |
| 11,560,188 | B2 * | 1/2023 | Moore | B60D 1/64 |
| 11,643,154 | B2 * | 5/2023 | Grossman | B62D 53/0842 |
| | | | | 701/23 |

(Continued)

FOREIGN PATENT DOCUMENTS

| | | | | |
|---|---|---|---|---|
| DE | 19913911 | A1 * | 10/1999 | B60D 1/62 |
| DE | 10111529 | A1 * | 9/2002 | A01B 59/068 |

(Continued)

OTHER PUBLICATIONS

WO-9718099-A1 English Translation (Year: 1997).*

(Continued)

*Primary Examiner* — James A Shriver, II
*Assistant Examiner* — Michael T. Walsh
(74) *Attorney, Agent, or Firm* — Leydig, Voit & Mayer, Ltd.

(57) ABSTRACT

A connecting system may be included for connecting tractor utility interfaces to corresponding trailer utility interfaces. Without limitation, the connecting system may include a trailer adapter that has a trailer adapter connector and a fastener, where the trailer adapter is configured to be releasably connected to the respective trailer utility interfaces, and where the fastener is configured to releasably fasten the trailer adapter to the trailer. The connecting system may also include a tractor adapter that has a tractor adapter connector and a positioning device, where the tractor adapter connector is configured to be connected to the respective tractor utility interfaces, and where the positioning device is configured to automatically move the tractor adapter connector in relation to the tractor in order to position the tractor adapter connector on the trailer adapter connector to obtain a functional connection between the respective utility interfaces.

20 Claims, 1 Drawing Sheet

(56) References Cited

U.S. PATENT DOCUMENTS

| | | | |
|---|---|---|---|
| 12,103,342 B2 * | 10/2024 | Delizo | B60K 35/60 |
| 2011/0037241 A1 * | 2/2011 | Temple | B60D 1/64 |
| | | | 280/421 |
| 2021/0245678 A1 * | 8/2021 | Smits | B60R 11/04 |
| 2021/0316761 A1 * | 10/2021 | Torrie | G05D 1/2247 |

FOREIGN PATENT DOCUMENTS

| | | | | |
|---|---|---|---|---|
| DE | 202005005676 U1 * | 9/2005 | | B60D 1/36 |
| DE | 102005060579 A1 * | 6/2007 | | B60D 1/26 |
| DE | 102018130586 A1 * | 6/2020 | | B60D 1/015 |
| DE | 102019202352 A1 * | 8/2020 | | B60D 1/015 |
| EP | 434472 A * | 6/1991 | | B60D 1/02 |
| EP | 1 710 145 A1 | 10/2006 | | |
| GB | 2619090 A * | 11/2023 | | B60S 13/00 |
| WO | WO-9718099 A1 * | 5/1997 | | B60D 1/64 |

OTHER PUBLICATIONS

DE-102019202352-A1 English Translation (Year: 2020).*
DE-10111529-A1 English Translation (Year: 2002).*
DE-19913911-A1 English Translation (Year: 1999).*
DE-102005060579-A1 English Translation (Year: 2007).*
EP-434472-A English Translation (Year: 1991).*
Office Action dated Mar. 31, 2022 for German Patent Application No. 10 2021 209 167.9 (12 pp.), note: pp. 1 and 2 are English language Exglanations to Section C. Result of Determination Document.

* cited by examiner

CONNECTING SYSTEM AND TRACTOR LINKAGE

RELATED APPLICATION

This application claims the benefit of, and priority to, German Patent Application DE 10 2021 209 167.9, filed Aug. 20, 2021, which is incorporated by reference herein in its entirety.

TECHNICAL FIELD

The present disclosure relates to a connecting system for connecting respective utility interfaces on a tractor to respective corresponding utility interfaces on a trailer that can be coupled to the tractor. Certain embodiments also relate to a tractor linkage.

BACKGROUND

A tractor linkage typically includes a tractor to which a trailer can be coupled such that it can be towed and pushed therewith. The trailer is mechanically coupled to the tractor for this. Respective utility interfaces must also be connected, e.g. for supplying the trailer with electricity and pneumatic pressure. This enables operation of the trailer's brakes for example. These utility interfaces must therefore be connected before the tractor is allowed to move the trailer. To do this, either the driver must exit the tractor, or some other person must make the connections. This involves relatively little effort with transport over longer distances.

At loading facilities, however, trails must frequently be moved only short distances for logistical reasons. This results in numerous connecting processes, which can be relatively labor intensive. By way of example, rearranging these trailers is slowed significantly if the driver has to exit the tractor. Other people hired to make the connections could be exposed to greater risks due to limited space and the numerous rearranging procedures.

DETAILED DESCRIPTION

Figure 1:
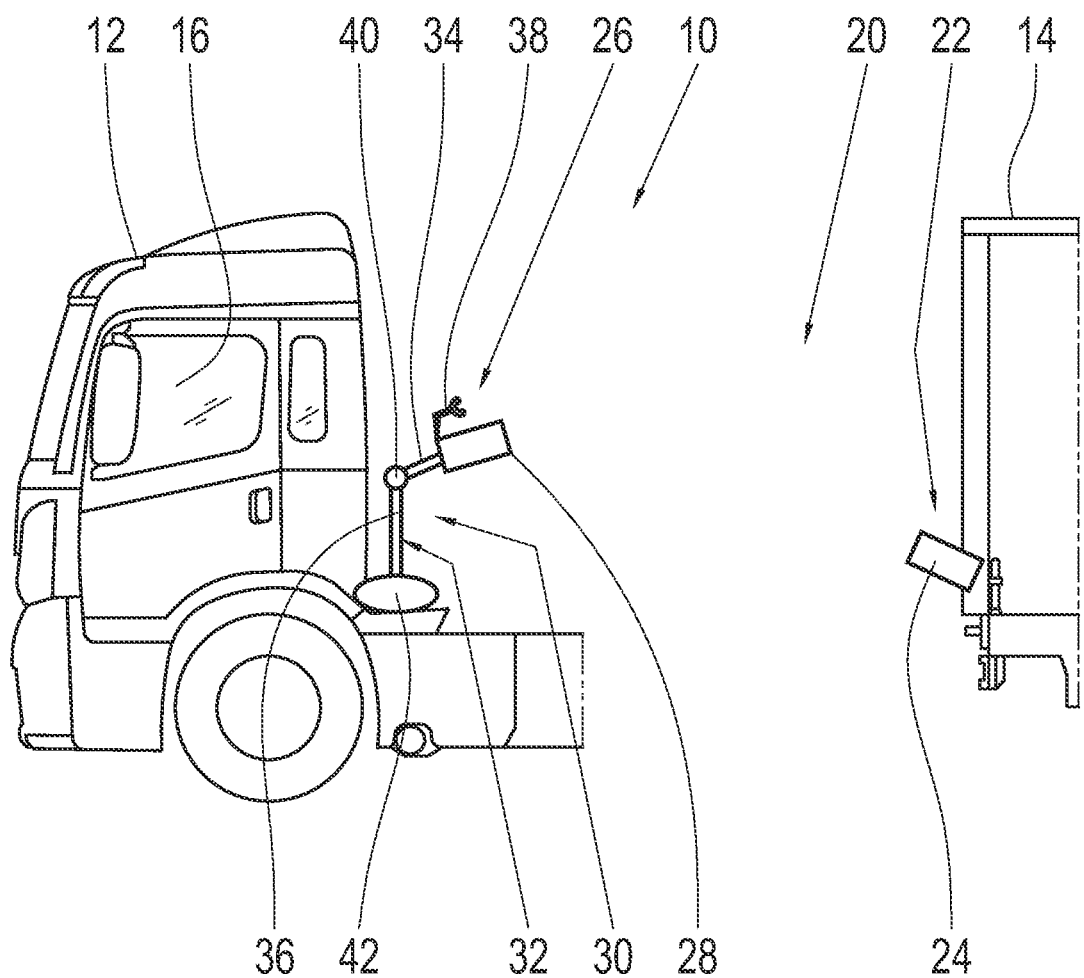
FIG. 1 shows a schematic side view of sections of a tractor linkage with a connecting system.

FIG. 1 illustrates a tractor linkage 10 in a schematic side view, comprising a tractor 12 and a trailer 14 coupled to the tractor 12. The tractor 12 has an operator cab 16 and two axles with respective wheels, at least one of which can be driven with a drive train in the tractor 12.

The trailer 14 also has respective axles and wheels. The trailer 14 is releasably coupled to the tractor 12 with a mechanical coupling system, in order that the tractor 12 can pull the trailer 14. The coupling system is a trailer coupling. FIG. 1 shows the state in which this coupling has not yet taken place. The mechanical coupling system in this embodiment is designed such that the trailer 14 can be automatically coupled to the tractor 12, as soon as the tractor 12 is in the right position in relation to the trailer 14 for this.

The trailer 14 must also be supplied by the tractor 12 with electricity and pressurized air, in order to operate the respective systems in the trailer 14, e.g. brakes and lights, when the tractor 12 is pulling it, and to be able to control them from the tractor 12. The tractor 12 and trailer 14 have corresponding utility interfaces for transferring electricity, signals and pressurized air when the utility interfaces are functionally connected to one another.

There is a connecting system for automating this functional connection. The connecting system 20 contains a trailer adapter 22. The trailer adapter 22 comprises a trailer adapter element 24, which shall be explained in greater detail in reference to FIG. 2, and a fastener. The trailer adapter element 22 is configured to be releasably connected to the respective trailer utility interfaces. The fastener is configured to releasably attach the trailer adapter 22 to the trailer 14. The adapter 22 is attached to a superstructure on the trailer 14, by means of a suction cup or magnet in the illustrated example. The adapter 22 is configured to be releasably attached to various types of trailers, e.g. trailers with and without superstructures. The adapter 22 can therefore be quickly and easily retrofitted to the trailer 14, or other trailers, in a loading facility, and quickly removed therefrom prior to leaving the facility.

The connecting system 20 also comprises a tractor adapter 26 with a tractor adapter element 28 and a positioning device 30. The tractor adapter element 28 is permanently connected to the respective tractor utility interfaces. The adapter 26 is likewise permanently mounted on the tractor 12. The positioning device 30 is configured to automatically move the tractor adapter element 28 in relation to the tractor 12, in order to position the tractor adapter element 28 on the trailer adapter element 24 to obtain a functional connection between the respective utility interfaces. The positioning takes place, for example, as soon as the tractor 12 and the trailer are close enough to one another. In this example, the positioning, and therefore the functional connection, automatically take place as soon as the trailer 14 is coupled to the tractor 12 by the mechanical coupling element on the tractor 12, such that the tractor 12 can pull the trailer 14. This requires no manual connecting of the respective utility interfaces.

The positioning device 30 has a moving articulated arm 32 that has a first arm element 34 and a second arm element 36. The first arm element 34 has a sensor device 38 and the adapter element 28 at the end further away from the tractor 12. The arm element 34 is connected at the other end to the end of the second arm element 36 that is further away from the tractor 12 via a joint 40. The other end of the second arm element 36 is connected to the tractor 12 via a swivel joint 42. The joint 40 allows the positioning device 30 to move the tractor adapter element 28 up and down. The swivel joint 42 allows the positioning device 30 to move the tractor adapter element 28 to the right and left. When the tractor 12 is driven while coupled to a trailer 14, the articulated arm 32 follows the movement of the trailer. In order to functionally connect or disconnect the respective utility interfaces, the articulated arm 32 can be motorized, in order to dock or decouple the tractor adapter element 28 to or from the trailer adapter element 24.

The sensor device 38 is configured to detect the trailer adapter element 24. The sensor in the sensor device 38 is therefore a camera, which is located on the articulated arm 32 next to the tractor adapter element 28. The detection comprises an identification of a label on the trailer adapter element 24, which is formed by two physically separate QR codes 44. The positioning device 30 is configured to move the tractor adapter element 28 in relation to the detected trailer adapter element 24, in order to position the tractor adapter element 28 on the trailer adapter element 24.

The connecting system 20 has a coupling device that is configured to releasably connect the tractor adapter element 28 to the trailer adapter element 24 when the tractor adapter element 28 is positioned on the trailer adapter element 24. The coupling device has at least one magnet 46 for this. In the illustrated example, there are two magnets 46 on the trailer adapter element 24, which can be seen clearly in FIG. 2. The tractor adapter element 28 can be connected to the trailer adapter element 24 by the magnetic fields generated by the respective magnets 46.

Once the trailer 14 is docked, a signal is sent from the tractor 12 to the positioning device 30. The camera then detects the QR codes 44, at which point the articulated arm 32 is aligned by the positioning device 30 and the tractor adapter element 28 is coupled to the trailer adapter element 24. The magnets 46 form a quick and simple connection that enables a precise alignment. Once they are aligned, this can be sent in one embodiment to a control unit for the positioning device 30, at which point the articulated arm 32 is extended, and the tractor adapter element 28 is mechanically connected to the trailer adapter element 24. The functional connection between the respective utility interface is conveyed to the control unit in this embodiment, and can then be communicated to the driver of the tractor 12.

There are also magnets on the tractor adapter element 28 in one embodiment, which are electromagnets in this case. The connection between the tractor adapter element 28 and the trailer adapter element 24 can therefore be obtained when a current flows through them. The magnetic fields of these magnets can be reversed by altering the current direction in order to release the connection between the tractor adapter element 28 and the trailer adapter element 24. When the trailer 14 is to be decoupled, the tractor 12 driver can send a command to the connecting system 20. The respective electromagnets are then provided with the reversed currents, thus reversing the magnetic fields, such that the mechanical connection between the tractor adapter element 28 and the trailer adapter element is released. This results in a decoupling. The articulated arm 32 is then returned to its initial position by the positioning device 30.

Figure 2:
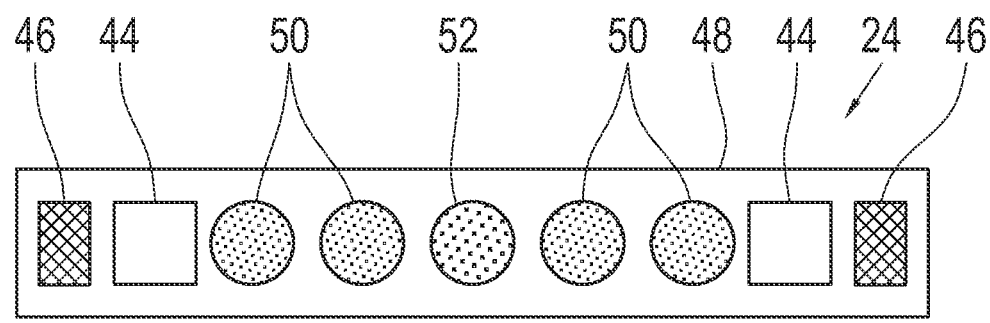
FIG. 2 shows an adapter element of a trailer adapter for the connecting system, in a schematic front view.

FIG. 2 shows a front view of the trailer adapter element 24 from a side facing away from the trailer. The trailer adapter element 24 has an adapter plate 48. There is a magnet 46 at each end. The respective QR codes 44 are located next to each magnet. The trailer adapter element 24 has a connection for each of the trailer utility interfaces between these magnets, comprising four pneumatic connections 50 and one centrally located electrical connection 52 in this case. The tractor adapter element 28 can have a similar structure, but without the respective QR codes 44. The tractor adapter element 28 also has a connection for each tractor utility interface, which corresponds in each case to one of the respective connections 50, 52 on the trailer adapter element 24. In this embodiment, the connections 50, 52 on the trailer adapter element 24 are female connectors, and those on the tractor adapter element 28 are male connectors.

The following description is included as additional disclosure that is consistent with the claims filed in the priority application.

A first aspect relates to a connecting system for connecting respective utility interfaces on a tractor to respective corresponding utility interfaces on a trailer that can be coupled to the tractor. The tractor can be a truck or a semi-tractor, by way of example. The tractor can comprise a drive train, containing a traction motor, and an operator cab. The trailer can be a semi-trailer, for example. The trailer can comprise a chassis and a receiving bed for freight, e.g. a platform for a container. The tractor can have a coupling element for mechanically connecting the trailer. The trailer can a have a corresponding coupling element. By way of example, the tractor can have a fifth wheel coupling plate, which encompasses a kingpin on the trailer when the trailer is connected. This connection allows for tractive forces to be transferred from the tractor to the trailer.

A tractor utility interface can be a connecting element with which power can be supplied for operating various devices in or on the trailer. An interface on the trailer can be a connecting element where power for operating the various devices on the trailer can be received. The term, "corresponding" is used for interfaces that are configured to be connected to one another. By way of example, the tractor can have a male connecting element and the trailer can have a corresponding female connecting element. By way of example, a utility interface can transfer electricity, and can be in the form of an electrical connection. This allows electricity to be supplied to the trailer for operating lights in or on the trailer. By way of example, one of the utility interfaces can transfer pneumatic pressure and be designed as a pneumatic connection. In this manner, pneumatic pressure can be provided for adjusting the trailer's suspension system. By connecting the trailer to the tractor, the trailer's brake system can also be supplied with the necessary energy. The brake system can also receive respective control signals via the electrical connection.

The connecting system has a trailer adapter with a trailer adapter element and a fastener. The trailer adapter element can be releasably connected to the respective utility interfaces on the trailer. The fastener can releasably connect the trailer adapter to the trailer. The fastener can be used to fasten the trailer adapter element to the trailer. The fastener can be configured to attach the trailer adapter element to various types of trailers, e.g. trailers with and without superstructures.

The adapter element on the trailer can be retrofitted as needed using the fastener, e.g. when it enters a loading facility. The adapter element can also be removed if necessary, e.g. when leaving the loading facility. It is therefore not necessary to provide each trailer with an adapter, thus reducing the overall costs of the system. It is also not necessary to permanently install the trailer adapter element on a trailer. By way of example, the fastener can have a clamp with which the trailer adapter can be attached to the trailer in a temporary manner. When attaching the adapter to the trailer, is it only necessary to connect the respective utility interfaces to the trailer adapter once.

The connecting system comprises a tractor adapter with a tractor adapter element. The tractor adapter element is configured to be connected to the respective tractor utility interfaces. The tractor adapter can be permanently connected to the tractor, i.e. permanently installed thereon. In the intended use, the tractor adapter can be non-releasably attached to the tractor.

The respective adapter elements can have a corresponding connection for each utility interface. The respective adapter elements can contain a plate. By way of example, the tractor adapter element can have an adapter plate with plug-in connectors arranged thereon, and the trailer adapter element can have a plate with corresponding plug-in connectors arranged thereon.

The tractor adapter contains a positioning device. The positioning device is configured to automatically displace the tractor adapter element in relation to the tractor, in order to position the tractor adapter element in relation to the trailer adapter element in order to functionally connect the respective utility interfaces. By way of example, the functional connection can be obtained automatically when the tractor adapter element is placed on the trailer adapter element. When the tractor adapter element is positioned on the trailer adapter element, they can come in contact with one another, and can also be oriented parallel to one another. The functional connection can enable the tractor to supply the trailer with energy. By way of example, electricity or pressurized air can be supplied once the connection has been established. The positioning device can have at least one motor for moving the tractor adapter element. The tractor adapter element can be connected to the tractor via the positioning device.

The positioning device enables the connection of the respective utility interfaces on the tractor and the trailer, without the driver having to exit the tractor, or having to provide a person at the connecting point between the tractor and the trailer. By way of example, the functional connection can be obtained automatically using sensor data. This makes the coupling of trailers to tractors simple, quick and secure. By way of example, it is only necessary to equip one tractor with the tractor adapter in a loading facility in order to rearrange respective trailers that are only temporarily equipped during their stay in the loading facility with a respective trailer adapter. Once a tractor is hooked up to the trailer, the positioning device can align the tractor adapter element and couple it to the trailer adapter element. This can also involve a mechanical connection of the tractor adapter element with the trailer adapter element. Once the trailer is disconnected, the tractor adapter element can also be automatically disconnected from the trailer adapter element, e.g. by the positioning device. The connecting system therefore makes it possible to quickly and easily rearrange the various trailers in the loading facility using a tractor, as long as the trailer adapters are attached to the respective trailers when they arrive. These trailer adapters can then be removed when the trailers leave the facility.

In one embodiment of the connecting system the positioning device can have a moving articulated arm. Such an articulated arm can have one or more arm elements. An arm element can be a rod or tube, for example. The articulated arm can have one or more joints. By way of example, the articulated arm can have a first and second arm element, which are then connected to one another at a joint. This articulated arm allows for the tractor adapter element to be moved around with a certain degree of freedom. The articulated arm makes it possible to span a distance between the tractor and the trailer adapter element. The articulated arm can be configured to hold the tractor adapter element. The tractor element can be attached to one end of the articulated arm. The other end of the articulated arm can be attached to the tractor. This allows the articulated arm to move the adapter element to a large extent.

In one embodiment of the connecting system the positioning device has a sensor device. The sensor device can be configured to detect the trailer adapter element. The sensor device can also be configured to scan the environment behind the tractor and identify the adapter element therein, e.g. using an image recognition algorithm. The positioning device can be configured to move the tractor adapter element in relation to the trailer element that has been detected, in order to position the tractor adapter element on the trailer adapter element. This results in an automated, sensor-supported, functional connection of the respective utility interfaces. The sensor device can be designed, for example, to generate respective sensor data, and the positioning device can be configured to automatically align the tractor adapter element for a functional connection with the trailer adapter element based on the sensor data. The sensor device can contain a sensor. The sensor can be designed as a camera, by way of example.

In one embodiment of the connecting system the sensor device contains a camera. The camera can be located on the articulated arm. This simplifies the positioning of the tractor adapter element on the trailer adapter element. By way of example, the tractor adapter element can be automatically moved such that the trailer adapter element remains in the middle of the image as it is approached. The camera can be located on the end of the articulated arm that is connected to the tractor adapter element. This places the camera near the tractor adapter element, thus simplifying calculation of the relative position of the trailer adapter element. The camera is also near the trailer adapter element when the connection has been established, thus enabling a fine tuning and also making it easier to detect the trailer adapter element.

In one embodiment of the connecting system the trailer adapter has a label located on the trailer adapter element. This can facilitate identification of the trailer adapter element. This label can also contain information, for example, regarding the number and types of respective interfaces. The sensor device can be configured to identify the trailer adapter element on the basis of the label attached thereto. By way of example, the label can be on the side of the adapter element facing the tractor adapter element for the functional connection therewith, when the tractor adapter element is also facing toward the trailer. This makes it particularly simple to reliably detect the label. The label can be printed onto the adapter plate on the trailer adapter element, or it can be glued thereto.

In one embodiment of the connecting system the label can contain a Quick Response Code. By way of example, the label can comprise a QR code. The QR code can contain a square matrix comprising black and white stripes, which can represent encoded data in a binary manner. The QR code can contain information regarding the trailer, such as a unique ID and the types and number of respective utility interfaces. The QR code can also contain information regard the design of the adapter element. This can facilitate a correct functional connection for supplying the trailer. A QR code can also contain standard orientation marks, which enable identification of the orientation of the QR code and thus the adapter element. These orientation marks can simplify a correct alignment of the tractor adapter element for the coupling.

In one embodiment of the connecting system the connecting system has a coupling device that is configured to releasably connect the tractor adapter element to the trailer adapter element when the tractor adapter element is positioned on the trailer adapter element. This makes it possible to prevent an unintended disconnection of the power supply for the trailer from the tractor. By way of example, the coupling device can form a snap-on connection between the tractor adapter element and the trailer adapter element. By way of example, the coupling device can provide a mechanical connection. The coupling device can be configured to automatically disconnect, e.g. in response to a disconnecting signal. The disconnecting signal can be activated by the driver of the tractor, for example.

In one embodiment of the connecting system the coupling device has a magnet with which the tractor adapter element can be connected by means of the magnetic field thereof to the trailer adapter element. The magnet can be an element that generates a magnetic field in its proximity. The magnet can be a permanent magnet. The magnet can also be an electromagnet, which only generates the magnetic field when supplied with an electric current. An interruption in the current can therefore release the connection between the tractor adapter element and the trailer adapter element. By reversing the electrical current through the electromagnet, the polarity of the magnet can also be reversed, thus generating a repelling force between the tractor adapter element and the trailer adapter element in order to separate them. When separated, the articulated arm on the tractor can be decoupled from the trailer, and then returned to the starting position. The magnet can be located on tractor adapter element. At least part of the trailer adapter element, in particular its adapter plate, can be made of a ferromagnetic metal.

The coupling device can be designed such that the tractor adapter element and the trailer adapter element are automatically correctly aligned when they are connected, thus bringing the respective connections into a functional connection with one another. The respective magnets can be arranged accordingly for this. The tractor adapter element and/or the trailer adapter element can also be mounted such that they can move. By way of example, the trailer adapter element can be mounted on the trailer such that it can pivot horizontally and vertically a few degrees and/or rotate about an axis. By way of example, the magnetic field can align the tractor adapter element with the trailer adapter element. This can enable a precise alignment.

In one embodiment of the connecting system the coupling device is designed such that the magnetic field of the magnet can be altered to release the connection between the tractor adapter element and the trailer adapter element. By way of example, the orientation of the magnetic field can be reversed, or the magnetic field can be terminated. The alteration can be caused, for example, by reversing the electrical flow. By way of example, the magnetic field can be shut off such that when the trailer is decoupled from the tractor, the connection is broken in order that the tractor can be driven away from the trailer.

In one embodiment of the connecting system, the tractor adapter is configured to be permanently attached to the tractor. The tractor can always have the tractor adapter attached to it. The tractor adapter can be installed permanently. The tractor can therefore be used with all trailers that have been equipped with the trailer adapter.

In another embodiment of the connecting system, the tractor adapter element has a connection for every tractor utility interface. The trailer adapter can have a connection corresponding to the respective connections on the tractor adapter element for every trailer utility interface. By way of example, the trailer and tractor connections can always form pairs. By way of example, some of the tractor connections and some of the trailer connections can be electrical contacts. By way of example, some of the tractor connections and some of the trailer connections can be pneumatic connectors. The respective corresponding connections can be designed such that the utility interfaces are functionally connected to one another by the positioning of the tractor adapter element on the trailer adapter element. This results in the functional connection without the need for further steps, e.g. a manual connection.

A second aspect relates to a tractor linkage. The tractor linkage can include a connecting system according to the first aspect. Respective advantages and further features can be derived from the explanations regarding the first aspect.

The tractor linkage comprises a tractor that has respective tractor utility interfaces, a trailer that can be coupled to the tractor, which has respective trailer utility interfaces, and a connecting system. The connecting system comprises a trailer adapter with a trailer adapter element and a fastener. The trailer adapter element is releasably connected to the respective trailer utility interfaces. The connecting system also comprises a tractor adapter with a tractor adapter element and a positioning device. The tractor adapter element is connected to the respective tractor utility interfaces. The positioning device is configured to automatically move the tractor adapter element in relation to the tractor in order to position the tractor adapter element on the trailer adapter element, thus obtaining a functional connection between the respective utility interfaces.

In one embodiment of the tractor linkage, the tractor linkage has a coupling system that is separate from the connecting system, which is configured to transfer a traction force from the tractor to the trailer coupled to the tractor. The coupling system can comprise a kingpin and a fifth wheel coupling plate, for example. The coupling system can also contain a locking device that locks the kingpin in place in the coupling plate.

REFERENCE SYMBOLS

10 tractor linkage
12 tractor
14 trailer
16 operator cab
20 connecting system
22 trailer adapter
24 trailer adapter element (or trailer adapter connector)
26 tractor adapter
28 tractor adapter element (or tractor adapter connector)
30 positioning device
32 articulated arm
34 arm element
36 arm element
38 sensor device
40 joint
42 swivel joint
44 QR code
46 magnet
48 adapter plate
50 pneumatic connection
52 electrical connection

We claim:

1. A connecting system for connecting tractor utility interfaces to corresponding trailer utility interfaces, the connecting system comprising:
   a trailer adapter that has a trailer adapter connector and a fastener,
   wherein the trailer adapter is configured to be releasably connected to the respective trailer utility interfaces, and
   wherein the fastener is configured to releasably fasten the trailer adapter to the trailer; and
   a tractor adapter that has a tractor adapter connector and a positioning device,
   wherein the tractor adapter connector is configured to be connected to the respective tractor utility interfaces, and
   wherein the positioning device is configured to automatically move the tractor adapter connector in relation to the tractor in order to position the tractor adapter connector on the trailer adapter connector to obtain a functional connection between the respective utility interfaces.

2. The connecting system according to claim 1, wherein the positioning device has a moving articulated arm, wherein the tractor adapter connector is attached to one end of the articulated arm, and wherein the other end of the articulated arm is configured to be attached to the tractor.

3. The connecting system according to claim 2, wherein the positioning device contains a sensor that is configured to detect the trailer adapter connector, wherein the positioning device is configured to move the tractor adapter connector in relation to the detected trailer adapter connector in order to position the tractor adapter connector on the trailer adapter connector, and the sensor has a camera, which is located on the articulated arm.

4. The connecting system according to claim 3, wherein the trailer adapter has a label on the trailer adapter connector, and wherein the sensor is configured to detect the trailer adapter connector on the basis of the label located thereon.

5. The connecting system according to claim 4, wherein the label contains a QR code.

6. The connecting system according to claim 1, wherein the positioning device has a sensor, which is configured to detect the trailer adapter connector, and wherein the positioning device is configured to move the tractor adapter connector on the basis of the detected trailer adapter connector, in order to position the tractor adapter connector on the trailer adapter connector.

7. The connecting system according to claim 1, wherein the connecting system contains a coupling device that is configured to releasably connect the tractor adapter connector and the trailer adapter connector to one another when the tractor adapter connector is positioned on the trailer adapter connector.

8. The connecting system according to claim 7, wherein the coupling device contains a magnet, wherein the tractor adapter connector can be connected to the trailer adapter connector through a magnetic field generated by the magnet.

9. The connecting system according to claim 8, wherein the coupling device is configured to reverse the magnetic field from the magnet in order to release the connection between the tractor adapter connector and the trailer adapter connector.

10. The connecting system according to claim 1, wherein the tractor adapter is configured to be permanently attached to the tractor.

11. The connecting system according to claim 1, wherein the tractor adapter connector has a connection for each tractor utility interface, and the trailer adapter connector has a connection for each trailer utility interface corresponding to the respective connections on the tractor adapter connector, wherein the respective corresponding connections are configured to be connected to one another to functionally connect the respective utility interfaces by positioning the tractor adapter connector on the trailer adapter connector.

12. A tractor linkage, comprising:
a tractor that has a set of tractor utility interfaces;
a trailer that can be coupled to the tractor, the trailer having a set of trailer utility interfaces configured for coupling to the set of tractor utility interfaces; and
a connecting system, the connection system comprising:
a trailer adapter with a trailer adapter connector and a fastener,
wherein the trailer adapter connector is releasably connected to the respective trailer utility interfaces, and
wherein the trailer adapter is releasably attached with the fastener to the trailer; and
a tractor adapter that has a tractor adapter connector and a positioning device,
wherein the tractor adapter connector is connected to the respective tractor utility interfaces, and
wherein the positioning device is configured to automatically move the tractor adapter connector in relation to the tractor in order to position the tractor adapter connector on the trailer adapter connector to obtain a functional connection between the respective utility interfaces.

13. The tractor linkage according to claim 12, further comprising a coupling system separate from the connecting system.

14. The tractor linkage according to claim 12, wherein the coupling system is configured to transfer a tractive force from the tractor to the trailer coupled to the tractor.

15. The tractor linkage according to claim 12, wherein the positioning device has a moving articulated arm, wherein the tractor adapter connector is attached to one end of the articulated arm, and wherein the other end of the articulated arm is configured to be attached to the tractor.

16. The tractor linkage according to claim 15, wherein the positioning device contains a sensor that is configured to detect the trailer adapter connector, wherein the positioning device is configured to move the tractor adapter connector in relation to the detected trailer adapter connector in order to position the tractor adapter connector on the trailer adapter connector, and the sensor has a camera, which is located on the articulated arm.

17. The tractor linkage according to claim 16, wherein the trailer adapter has a label on the trailer adapter connector, and the sensor is configured to detect the trailer adapter connector on the basis of the label located thereon.

18. The tractor linkage according to claim 17, wherein the label contains a QR code.

19. The tractor linkage according to claim 12, wherein the positioning device has a sensor, which is configured to detect the trailer adapter connector, and wherein the positioning device is configured to move the tractor adapter connector on the basis of the detected trailer adapter connector, in order to position the tractor adapter connector on the trailer adapter connector.

20. The tractor linkage according to claim 12, wherein the connecting system contains a coupling device that is configured to releasably connect the tractor adapter connector and the trailer adapter connector to one another when the tractor adapter connector is positioned on the trailer adapter connector.

* * * * *